3,126,395
NOVEL BICYCLO(2,2,2)OCTANE COMPOUNDS
Keizo Kitahonoki, 848 Nabata, Ikoma-machi, Ikoma-gun, Japan, and Michiko Kakehi, 41 2-chome, Morikoji, Asahi-ku, Osaka-shi, Japan
No Drawing. Filed Sept. 7, 1961, Ser. No. 136,433
Claims priority, application Japan Oct. 16, 1958
32 Claims. (Cl. 260—319)

This invention relates to compositions of matter, particularly to chemotherapeutic organic compounds and methods of their preparation, and more particularly to compounds applicable to the treatment of cardio-vascular diseases.

Specifically the invention involves a novel class of compounds, namely: dialkylaminoalkyl imides, dialkenylaminoalkyl imides and heterocyclic aminoalkyl imides of bicyclo(2,2,2)octane-2,3-dicarboxylic anhydrides, their reduction products and simple and quaternary salts thereof. The quaternary salts are most effective in the treatment of cardio-vascular diseases, particularly hypertension.

It is a basic object of the present invention to provide novel organic compounds and methods for the preparation thereof.

Another object is to provide novel compounds characterized by chemotherapeutic or medicinal properties and particularly by the ability to induce a marked hypotensive effect, i.e., to relieve hypertension.

A more specific object is to provide novel compounds, namely: bicyclo(2,2,2)octane compounds including imides, bases and salts thereof.

Another and equally important object of the invention is the provision of methods of synthesizing the novel compounds referred to in the foregoing objects.

These and other objects and the manner in which they are accomplished are apparent to those conversant with the art from the following description of the general class of novel compounds and the specific examples of particular members thereof as well as general and specific methods of their synthesis.

Generally stated, the novel compounds of the present invention may be prepared according to the methods shown in the following schema:

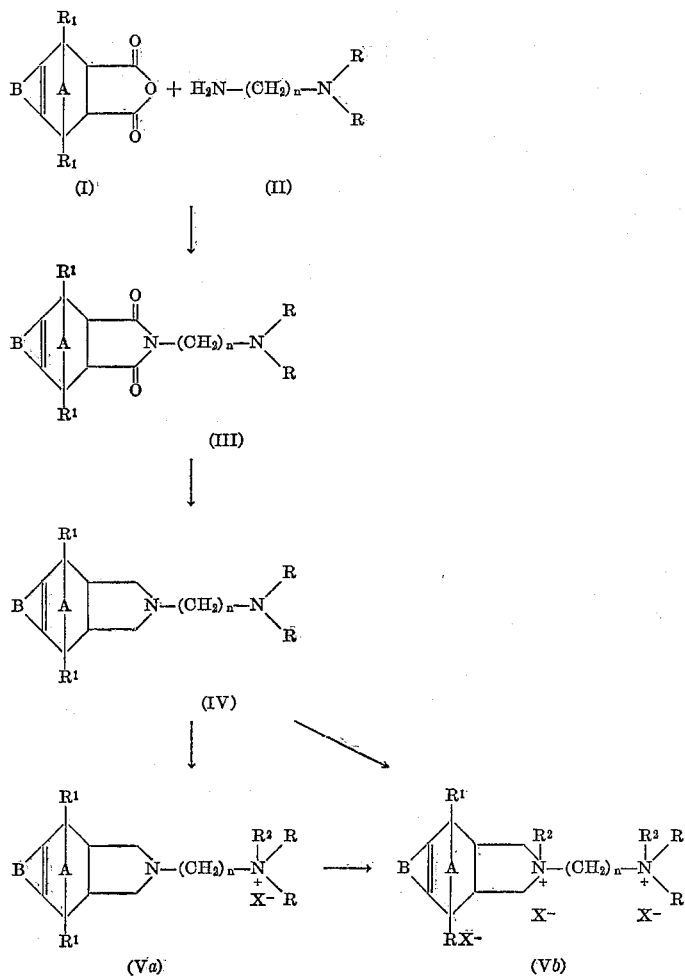

In the schema, $n$ is a number from 2 to 5; R represents a lower alkyl or alkenyl radical with up to 5 carbon atoms or, combined as

a nitrogen-containing heterocyclic ring structure; $R^1$ represents a lower alkyl radical with from 1 to 3 carbon atoms; R² represents a hydrogen atom or a lower alkyl radical with up to 3 carbon atoms; A represents

—CH₂CH₂—

—CH=CH—, —CH₂CH(OH)— or —CH₂CO—; B represents —CH=CH—CH=CH— or

and X represents an anion, either inorganic, e.g. a halogen (Br⁻, I⁻ and Cl⁻), HSO₄⁻, or organic, e.g. CH₃COO—. The structure

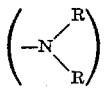

may represent, inter alia, morpholino, piperidino, pyrrolidino, piperazino, N-methylpiperazino and pyrazolidino. The lower alkyl and alkenyl include both straight chain and branched chain hydrocarbon radicals, e.g. methyl, ethyl, propyl, isopropyl, butyl, pentyl, allyl, vinyl, butenyl, pentenyl. Said lower alkyl or alkenyl radicals may be the same or different even when represented by the same symbol. Further, X may be an organic or inorganic anion such as chloride, bromide, iodide, sulfate, oxalate, acetate, malate, maleate, succinate, citrate, tartarate, naphthalendisulfonate, phenolphthalinate, methylenedisalicylate and the like.

The starting compounds (I) are obtained by Diels-Alder reaction of aromatic compounds with maleic anhydride [cf. Pharm. Bull. (Japan), vol. 4, page 12 (1956)], and are exemplified as follows:

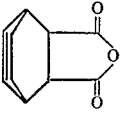

Bicyclo(2,2,2)oct-7-ene-2,3-dicarboxylic anhydride (VI)

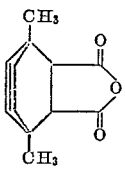

1,4-dimethyl-bicyclo(2,2,2)oct-7-ene-2,3-dicarboxylic anhydride (VII)

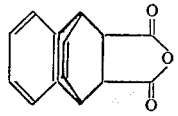

Benzo(1'',2'':7,8)bicyclo(2,2,2)oct-5-ene-2,3-dicarboxylic anhydride (VIII)

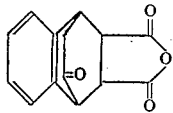

5-oxo-benzo(1'',2'':7,8)bicyclo(2,2,2)octane-2,3-dicarboxylic anhydride (IX)

The starting compounds (II) are exemplified as follows:

N-dimethylaminoethylamine

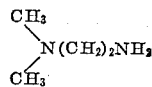

(X)

N-methylethylaminoethylamine

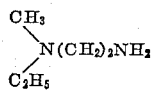

(XI)

N-dimethylaminopropylamine

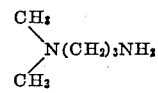

(XII)

N-diethylaminopropylamine

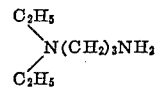

(XIII)

N-diethylaminobutylamine

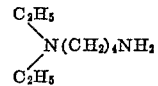

(XIV)

N-dibutylaminobutylamine

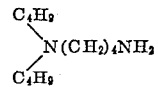

(XV)

N-diallylaminobutylamine

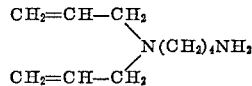

(XVI)

Pyrrolidinoethylamine

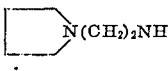

(XVII)

Morpholinopropylamine

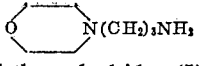

(XVIII)

The reaction of the anhydrides (I) with the amines (II) is easily carried out by refluxing in a suitable solvent. A hydrophilic solvent, such as dioxane, acetone and acetic acid, is preferred. The reaction also proceeds without a solvent, but the yield is less satisfactory. Owing to the activity of the anhydrides, no catalyst is necessary for this reaction when a solvent is employed. After removal of the reaction solvent in vacuo, the crude product may be recrystallized from a suitable organic solvent, such as ethyl acetate, diethyl ether, methanol, ethanol and acetone, to give pure imide (III). Alternatively, the imide may be isolated directly from the reaction mixture by vacuum distillation. Every compound (I), e.g. each of compounds (VI) through (IX), can be reacted as indicated supra with every compound (II), e.g. each of compounds (X) to (XVIII).

Thus obtained imide is reduced to the corresponding base (IV) by the use of a reducing agent. As a reducing agent an alkali metal hydride, preferably lithium aluminum hydride, can be used. The reaction proceeds readily by stirring imide (III) with lithium aluminum hydride in tetrahydrofuran and ethyl ether for several hours at a temperature within the range of from around 20° to 60° C. The resulting free base (IV) is isolated by vacuum distillation from the ethyl ether-tetrahydrofuran layer after decomposing excess reducing agent with water. Reducible susbtituents of the bicyclo(2,2,2) octane nucleus, which are reduced at the same time as the reduction of the imide (III), may be subsequently oxidized selectively to their former unreduced forms.

Base (IV) can be changed to mono-simple or quaternary salts (Va) or di-simple or quaternary salts (Vb) by addition of reagents R²X, wherein R² and X have the same significance as stated above. Thus obtained salts may be converted into other novel salts by exchanging their anions with suitable anion donors. The di-simple or quaternary salts (Vb) are usually obtained by using a stoichiometric (>2:1 molar ratio) excess of reagent R²X. The mono-simple or quaternary salts (Va) may be prepared with an equimolar amount of reagent R²X.

Compounds (Va) can be changed to the di-simple or quaternary salts (Vb) by treating with one more equimolar amount of reagent R²X. In the latter case, if the reagent is different from that used first, it is possible to obtain a compound (Vb) wherein the two R² and/or X are different from each other.

As reagent R²X there may be employed an inorganic acid, e.g. hydrochloric acid, hydrobromic acid, sulfuric acid; an organic acid, e.g. oxalic acid, acetic acid, malic acid, maleic acid, succinic acid, citiric acid, tartaric acid, phenolphthalin, methylenedisalicyclic acid, naphthalenedisulfonic acid; or an alkalating agent, e.g. methyl chloride, methyl bromide, methyl iodide, ethyl chloride, ethyl iodide, methyl sulfate.

The particular details of the method for carrying out said addition may be varied in accordance with the properties of the reagents used. The starting compounds are easily reacted with the reagent in a suitable solvent, such as water, methanol and ethanol. Heating may be employed if desired to increase the reaction rate. After removal of solvent and excess reagent from the reaction mixture, the residue is recrystallized from a suitable solvent to obtain the product. When gaseous reagents, such as hydrogen chloride, are used, they may be passed through the solution of starting compounds (in a suitable solvent) to carry out the reaction.

The novel compounds of the present invention possess hypotensive activity and are effective in the treatment of hypertension. The di-quaternary salts are particularly active in mammals at a low dosage level and display at the same time a favorable therapeutic ratio. Specifically, these salts exhibit an intensity from treble to septuple and a duration of action from quintuple to decuple, i.e. compared with "hexamethonium," which is one of the model hypotensive agents at present; moreover, the toxicity of these novel salts remains at very low level. Therefore, compounds of the present invention are particularly valuable substances for the above-stated therapeutic purpose.

The following examples illustrate the synthesis in detail, and are presented by way of illustration only and not as indicating the scope of the invention.

*Example 1*

(A) 1'-(ω-dimethylaminoethyl) - bicyclo(2,2,2)octano(2,3:3',4')pyrrolidin-7-ene-2',5'-dione.

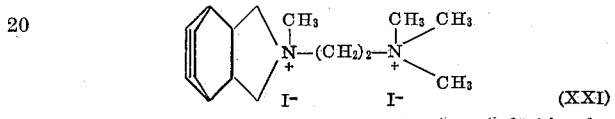

(XIX)

To a solution of 1.0 gram (g.) of bicyclo(2,2,2)oct-7-ene-2,3-dicarboxylic anhydride in 20 cubiccentimeters (cc.) of dioxane is added dropwise a solution of 0.470 g. of N-dimethylaminoethylamine in 15 cc. of dioxane, and the mixture is refluxed at 120° C. over an oil bath for 9.5 hours. Removal of the solvent by distillation from the reaction product gives 1.327 g. of 1'-(ω-dimethylaminoethyl) - bicyclo(2,2,2)octano(2,3:3',4')pyrrolidin-7-ene-2',5'-dione as crude crystals. The yield is 94.5%. The crude crystals are recrystallized from petroleumether to give scale crystals melting at 84° to 85° C.

*Analysis.*—Calcd. (analysis calculated) for $C_{14}H_{20}O_2N_2$

C, 67.71; H, 8.12; H, 11.28. Found: C, 67.91; H, 8.09; N, 11.21.

(B) 1'-(ω-dimethylaminoethyl) - bicyclo(2,2,2)octano(2,3:3',4')pyrrolidin-7-ene.

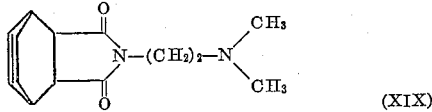

(XX)

To the solution of 0.7 g. of lithium aluminum hydride in 30 cc. of diethyl ether is added a solution of 0.849 g. of 1' - (ω - dimethylaminoethyl) - bicyclo(2,2,2)octano-(2,3:3',4')pyrrolidin-7-ene-2',5'-dione in 30 cc. of diethyl ether with stirring. The mixture is refluxed at 35° C. for 5 hours; then excess lithium aluminum hydride is decomposed by the addition of 3 cc. of water under ice-cooling. After further stirring for 3 hours at room temperature (about 20° C.), the ether layer is separated. The precipitate is shaken two times with diethyl ether. These ether layers are combined and dried over sodium sulfate. The solvent is removed, and the residue is distilled under a reduced pressure (0.005 millimeter of mercury) to give 0.560 g. of 1'-(ω-dimethylaminoethyl)-bicyclo(2,2,2)-octano(2,3:3',4')pyrrolidin-7-ene as a pale yellow liquid boiling at 89° to 91° C./0.005 millimeter of mercury (mm. Hg).

*Analysis.*—Calcd. for $C_{14}H_{24}N_2$: C, 76.30; H, 10.97; N, 12.71. Found: C, 76.16; H, 11.15; N, 12.10.

(C) Dimethiodide of 1'-(ω-dimethylaminoethyl)-bicyclo(2,2,2)octano(2,3:3',4')pyrrolidin-7-ene.

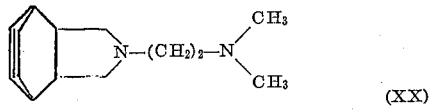

(XXI)

To 0.248 g. of 1'-(ω-dimethylaminoethyl)-bicyclo-(2,2,2)octano(2,3:3',4')pyrrolidin-7-ene are added 2 g. of methyl iodide and 6 cc. of methanol, and the mixture is refluxed (about 65° C.) for 5 hours. Then, the solvent is removed from the reaction mixture, and the residue is recrystallized from methanol to give 0.385 g. of the dimethiodide of the starting material as prisms melting at 253° to 254° C. (dec.).

*Analysis.*—Calcd. for $C_{16}H_{30}N_2I_2$: C, 38.10; H, 5.99; N, 5.55; I, 50.32. Found: C, 38.18; H, 5.88; N, 5.86; I, 49.94

*Example 2*

(A) 1' - (ω - diethylaminoethyl) - bicyclo(2,2,2)octano(2,3:3',4')pyrrolidin-7-ene-2',5'-dione

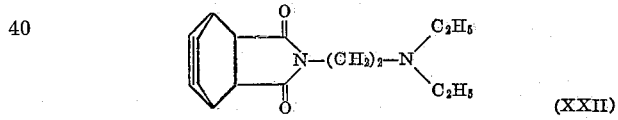

(XXII)

To the solution of 4.969 g. of bicyclo(2,2,2)oct-7-ene-2,3-dicarboxylic anhydride in 80 cc. of dioxane a solution of 3.6 g. of N-diethylaminoethylamine in 20 cc. of dioxane is added. The mixture is refluxed at 120° C. on an oil bath for 3.5 hours. Removal of the solvent from the reaction mixture by distillation gives 8.274 g. of 1' - (ω - diethylaminoethyl) - bicyclo(2,2,2)octano-(2,3:3',4')pyrrolidin-7-ene-2',5'-dione as a yellow oil. This is purified by distillation under a reduced pressure (0.005 mm. Hg) to give 7.043 g. of the pure substance boiling at 123° to 125° C./0.005 mm. Hg. The yield is 91.5%.

*Analysis.*—Calcd. for $C_{16}H_{24}O_2N_2$: C, 69.53; H, 8.75; N, 10.14. Found: C, 69.73; H, 8.73; N, 10.56.

(B) 1' - (ω - diethylaminoethyl) - bicyclo(2,2,2)octano(2,3:3',4')pyrrolidin-7-ene.

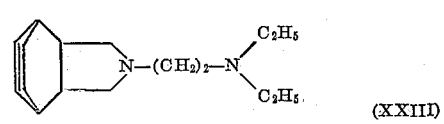

(XXIII)

To the solution of 4.8 g. of lithium aluminum hydride in 130 cc. of diethyl ether a solution of 7.043 g. of 1'-(ω-diethylaminoethyl) - bicyclo(2,2,2)octano(2,3:3',4')pyrrolidin-7-ene-2',5'-dione in 150 cc. of diethyl ether is added with stirring. The mixture is refluxed at 36° C. for 4 hours; then excess lithium aluminum hydride is decomposed with water under ice-cooling (about 5° C.). After further stirring for 2 hours at room temperature (about 20° C.), the ether layer is separated. The precipitate is shaken with diethyl ether three times. These ether layers are combined and dried over sodium sulfate. The solvent is removed by distillation, and the residue is distilled under a reduced pressure (0.005 mm. Hg) to give 5.787 g. of 1'-(ω-diethylaminoethyl)-bicyclo(2,2,2)octano(2,3:3',4')pyrrolidin-7-ene as a colorless liquid boiling at 106° to 110° C./0.005 mm. Hg.

*Analysis.*—Calcd. for $C_{16}H_{28}N_2$: C, 77.36; H, 11.36; N, 11.28. Found: C, 77.29; H, 11.43; N, 11.18.

(C) Dimethiodide of 1'-(ω-diethylaminoethyl)-bicyclo-(2,2,2)octano(2,3:3',4')pyrrolidin-7-ene.

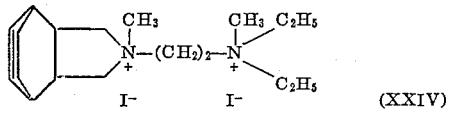

(XXIV)

To 2.980 g. of 1'-(ω-diethylaminoethyl)-bicyclo-(2,2,2)octano(2,3:3',4')pyrrolidin-7-ene are added 20.211 g. of methyl iodide and 25 cc. of methanol; the mixture is refluxed (about 65° C.) for 4 hours. Then, the solvent is removed from the reaction mixture, and the residue is recrystallized from acetone to give 5.202 g. of the dimethoidide of the starting material as needles melting at 235° to 235.5° C. (dec.).

*Analysis.*—Calcd. for $C_{18}H_{34}N_2I_2$: C, 40.62; H, 6.43; N, 5.26; I, 47.67. Found: C, 40.39; H, 6.59; N, 5.39; I, 47.27.

(C') Dimethochloride of 1'-(ω-diethylaminoethyl)-bicyclo(2,2,2)octano(2,3:3',4')pyrrolidin-7-ene.

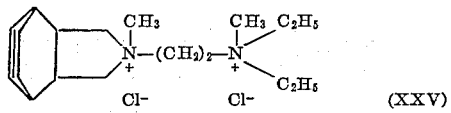

(XXV)

To the solution of 1.634 g. of silver nitrate in 6 cc. of hot water (about 80° C.) are added 1.5 cc. of concentrated hydrochloric acid. The precipitated silver chloride is collected and washed with hot water (about 80° C.). Thus obtained silver chloride is suspended in 20 cc. of hot water (about 80° C.) and 1.685 g. of the dimethiodide of 1' - (ω - diethylaminoethyl) - bicyclo(2,2,2)octano-(2,3:3',4')pyrrolidin-7-ene are added. After stirring for 50 minutes, the reaction mixture is filtered. From the filtrate water is removed by evaporation under a reduced pressure, and the residue is recrystallized from a 1:1 (by volume) admixture of methanol-acetone to give 0.786 g. of the dimethochloride of 1'-(ω-diethylaminoethyl)-bicyclo(2,2,2)octano(2,3:3',4')pyrrolidin-7-ene as needles. The melting point of the compound cannot be measured because of hygroscopicity.

*Example 3*

(A) 1' - (ω - dimethylaminopropyl) - bicyclo(2,2,2)-octano(2,3:3',4')pyrrolidin-7-ene-2',5'-dione.

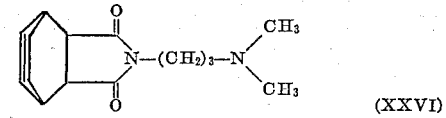

(XXVI)

To the solution of 1.044 g. of bicyclo(2,2,2)oct-7-ene-2,3-dicarboxylic anhydride in 20 cc. of dioxane a solution of 0.681 g. of N-dimethylaminopropylamine in 30 cc. of dioxane is added dropwise. After standing for 20 minutes (at about 20° C.) following the addition, white crystalline substance is precipitated. After refluxing at 120° C. on an oil bath for 11 hours, the solvent is removed by distillation to give 1.577 g. of 1'-(ω-dimethylaminopropyl) - bicyclo(2,2,2)octano(2,3:3',4')pyrrolidin-7-ene-2',5'-dione as a yellow oil. The yield is 96.1%. This compound is purified by distillation under a reduced pressure at 140° to 142° C./0.01 mm. Hg.

*Analysis.*—Calcd. for $C_{15}H_{22}N_2O_2$: C, 68.67; H, 8.45; N, 10.68. Found: C, 68.51; H, 8.58; N, 11.01.

(B) 1' - (ω - dimethylaminopropyl) - bicyclo(2,2,2)octano(2,3:3',4')pyrrolidin-7-ene.

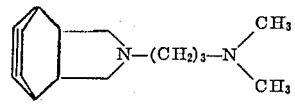

(XXVII)

To a solution of 3.9 g. of lithium aluminum hydride in 130 cc. of diethyl ether a solution of 4.86 g. of 1'-(ω-dimethylaminopropyl) - bicyclo(2,2,2)octano(2,3:3',4') - pyrrolidin-7-ene-2',5'-dione in 150 cc. of diethyl ether is added with stirring over a period of 2 hours. After refluxing at 35° C. for 3 hours, the reaction mixture is cooled at 5° to 10° C., and excess lithium aluminum hydride is decomposed by the addition of 15 cc. of water. After standing for 1.5 hours at room temperature (about 20° C.), the reaction mixture is decanted. The mother liquor is dried over sodium sulfate, and the solvent is removed by distillation. The residue is extracted with diethyl ether. From the ether layer the solvent is removed by distillation, and then the oily residue is distilled under a reduced pressure (0.005 mm. Hg) to give 3.89 g. of 1'-(ω - dimethylaminopropyl) - bicyclo(2,2,2)octano(2,3: 3',4')pyrrolidin-7-ene as a fraction boiling at 90° to 95° C./0.005 mm. Hg, which crystallizes soon after distillation. The melting point of this compound is 33° C.

*Analysis.*—Calcd. for $C_{15}H_{26}N_2$: C, 76.86; H, 11.18; N, 11.95. Found: C, 76.84; H, 11.23; N, 11.65.

(C) Dimethiodide of 1'-(ω-dimethylaminopropyl)-bicyclo(2,2,2)octano(2,3:3',4')pyrrolidin-7-ene.

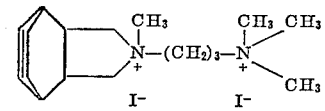

(XXVIII)

To 0.391 g. of 1' - (ω-dimethylaminopropyl)-bicyclo-(2,2,2)octano(2,3:3',4')pyrrolidin-7-ene are added 1.932 g. of methyl iodide and 5 cc. of methanol. The resulting mixture is refluxed at about 65° C. for 5 hours. Then, the solvent is removed from the reaction mixture, and the residue is recrystallized from methanol to give 0.573 g. of the dimethiodide of the starting material as colorless pillars melting at 260° to 261° C. (dec.).

*Analysis.*—Calcd. for $C_{17}H_{32}N_2I_2 \cdot H_2O$: C, 38.06; H, 6.38; N, 5.24; I, 47.32. Found: C, 38.45; H, 6.45; N, 5.67; I, 47.49.

(C') Dimethochloride of 1'-(ω-dimethylaminopropyl)-bicyclo(2,2,2)octano(2,3:3'4')pyrrolidin-7-ene.

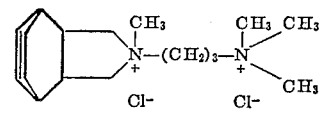

(XXIX)

To a solution of 8.5 g. of silver nitrate in 30 cc. of hot water (about 80° C.) are added 8 cc. of concentrated hydrochloric acid. The precipitated silver chloride is collected and washed with hot water (about 80° C.). Thus obtained silver chloride is suspended in 50 cc. of hot water (about 80° C.), and 8.383 g. of the dimethiodide of 1' - (ω - dimethylaminopropyl) - bicyclo(2,2,2)octano- (2,3:3'4')pyrrolidin-7-ene are added with stirring over a period of 1.3 hours. After stirring for an additional 50 minutes, the reaction mixture is filtered. Water is evaporated from the filtrate under a reduced pressure, and the residue is recrystallized from methanol-acetone (1:1 by volume) to give 4.640 g. of the dimethochloride of 1' - (ω - dimethylaminopropyl) - bicyclo(2,2,2)octano (2,3:3'4')pyrrolidin-7-ene as scales melting at 272° to 273° C. (dec.).

*Analysis.*—Calcd. for $C_{17}H_{32}N_2Cl_2$: C, 60.88; H, 9.61; N, 8.35. Found: C, 61.34; H, 9.43; N, 8.68.

Example 4

(A) 1'-(ω-diethylaminobutyl)-bicyclo(2,2,2)octano(2,3:3',4')pyrrolidin-7-ene-2',5'-dione.

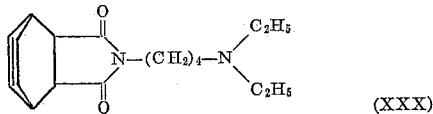

(XXX)

To the solution of 4.0 g. of bicyclo(2,2,2)oct-7-ene-2,3-dicarboxylic anhydride in 30 cc. of dioxane a solution of 3.6 g. of N-diethylaminobutylamine in 20 cc. of dioxane is added, and the mixture is refluxed at from 110° to 120° C. for 9 hours. Removal of the solvent from the reaction mixture gives a yellow oil which is distilled under a reduced pressure (4 mm. Hg) to obtain 5.89 g. of 1'-(ω-diethylaminobutyl)-bicyclo(2,2,2)octano(2,3:3',4')pyrollidin-7-ene-2',5'-dione boiling at 192° to 194° C./4 mm. Hg. The yield is 87.6%. The monopicrate of this compound, recrystallized from alcohol, has yellow pillar crystals melting at 139° to 140° C.

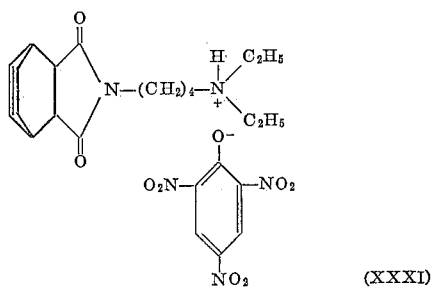

(XXXI)

*Analysis.*—Calcd. for $C_{18}H_{28}O_2N_2 \cdot C_6H_3O_7N_3$: C, 54.03; H, 5.86; N, 13.13. Found: C, 53.81; H, 5.87; N, 13.30.

(B) 1'-(ω-diethylaminobutyl)-bicyclo(2,2,2)octano(2,3:3',4')pyrrolidin-7-ene.

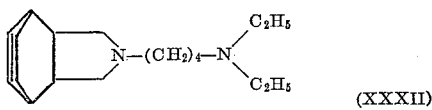

(XXXII)

To a solution of 5.0 g. of lithium aluminum hydride in 80 cc. of diethyl ether a solution of 5.8 g. of 1'-(ω-diethylaminobutyl)-bicyclo(2,2,2)octano(2,3:3',4')pyrrolidin-7-ene-2',5'-dione in 80 cc. of diethyl ether is added with stirring. The mixture is refluxed at 36° C. for 3 hours, and excess lithium aluminum hydride is decomposed by adding 10 cc. of water under ice-cooling (about 5° C.). After further stirring for 1 hour at room temperature (about 20° C.), the ether layer is separated. The precipitate is shaken with ether three times. These ether layers are combined and dried over sodium sulfate. After removal of the solvent by distillation, the residue is distilled under a reduced pressure (4 mm. Hg) to give 4.1 g. of 1'-(ω-diethylaminobutyl)-bicyclo(2,2,2)octano(2,3:3',4')pyrrolidin-7-ene as a colorless liquid boiling at 152° to 156° C/4 mm. Hg.

*Analysis.*—Calcd. for $C_{18}H_{32}N_2$: C, 78.20; H, 11.67; N, 10.13. Found: C, 77.97; H, 11.63; N, 10.70.

The precipitate of this compound is recrystallized from ethanol to give needles melting at 171° to 172° C. (moistened at 163° C.).

(C) Dimethiodide of 1'-(ω-diethylaminobutyl)-bicyclo(2,2,2)octano(2,3:3',4')pyrrolidin-7-ene.

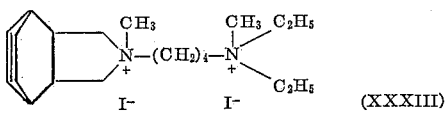

(XXXIII)

To 3 g. of 1'-(ω-diethylaminobutyl)-bicyclo(2,2,2)octano(2,3:3',4')pyrrolidin-7-ene are added 15 g. of methyl iodide and 8 cc. of methanol, and the mixture is refluxed (about 65° C.) for 5 hours. Then, the solvent is removed from the reaction mixture, and the residue is recrystallized from methanol to give the dimethiodide of the starting material as needles melting at 225° to 226° C. (dec.).

*Analysis.*—Calcd. for $C_{20}H_{38}N_2I_2$: C, 42.86; H, 6.83; N, 4.96; I, 45.30. Found: C, 42.67; H, 7.11; N, 5.09; I, 45.68.

Example 5

(A) 1'-(ω-dimethylaminopropyl)-1,4-dimethyl-bicyclo(2,2,2)octano(2,3:3',4')pyrrolidin-1-ene-2',5'-dione.

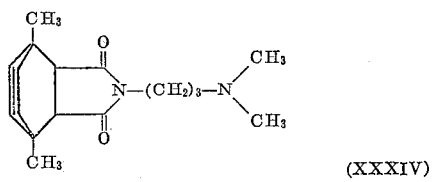

(XXXIV)

To a solution of 2.397 g. of 1,4-dimethyl-bicyclo(2,2,2)oct-7-ene-2,3-dicarboxylic anhydride in 20 cc. of dioxane a solution of 1.4 g. of N-dimethylaminopropylamine in 20 cc. of dioxane is added, and the mixture is refluxed on an oil bath at 120° C. for 5.5 hours. Removal of the solvent by distillation from the reaction mixture gives 1'-(ω-dimethylaminopropyl)-1,4-dimethyl-bicyclo(2,2,2)octano(2,3:3',4')pyrrolidin-7-ene-2',5'-dione as an yellow oil. This oil is distilled under a reduced pressure to give 2.167 g. of the pure substance boiling at 122° to 123° C./0.005 mm. Hg. The yield is 6.9%.

*Analysis.*—Calcd. for $C_{17}H_{26}O_2N_2$: C, 70.31; H, 9.02; N, 9.65. Found: C, 70.60; H, 9.18; N, 9.88.

(B) 1'-(ω-dimethylaminopropyl)-1,4-dimethyl-bicyclo(2,2,2)octano(2,3:3',4')pyrrolidin-7-ene.

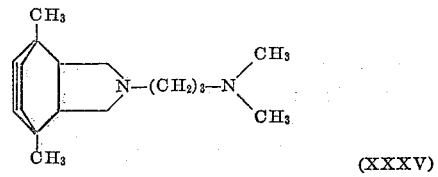

(XXXV)

To a solution of 1.5 g. of lithium aluminum hydride in 100 cc. of diethyl ether a solution of 2.167 g. of 1'-(ω-dimethylaminopropyl)-1,4-dimethyl-bicyclo(2,2,2)octano(2,3:3',4')pyrrolidin-7-ene-2',5'-dione in 200 cc. of diethyl ether is added with stirring. The mixture is refluxed at 36° C. for 4 hours, and then excess lithium aluminum hydride is decomposed by the addition of 5 cc. of water under ice-cooling (about 5° C.). After further stirring for 1 hour at room temperature (about 20° C.), the ether layer is separated. The precipitate is shaken with diethyl ether three times. These ether layers are combined and dried over sodium sulfate. After removal of the solvent by distillation, the residue is distilled under a reduced pressure (0.01 mm. Hg) to give 1.655 g. of 1'-(ω-dimethylaminopropyl)-1,4-dimethyl-bicyclo(2,2,2)octano(2,3:3',4')-pyrrolidin-7-ene as a colorless liquid boiling at 99° to 100° C./0.01 mm. Hg.

(C) Dimethiodide of 1'-(ω-dimethylaminopropyl)-bicyclo(2,2,2)octano(2,3:3',4')pyrrolidin-7-ene.

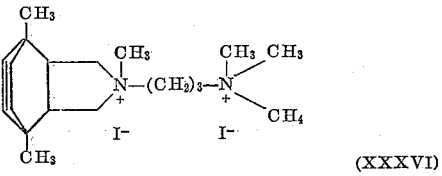

(XXXVI)

To 0.816 g. of 1'-(ω-dimethylaminopropyl)-1,4-dimethyl-bicyclo(2,2,2)octano(2,3:3',4')pyrrolidin-7-ene are added 3.50 g. of methyl iodide and 6 cc. of methanol, and the mixture is refluxed (about 65° C.) for 4.5 hours. Then, the solvent is removed from the reaction mixture, and the residue is recrystallized from methanol-acetone (1:1 by volume) to give 0.755 g. of the dimethiodide of the starting material as needles melting at 268° to 269° C. (dec.).

*Analysis.*—Calcd. for $C_{19}H_{36}N_2I_2 \cdot \frac{1}{2}H_2O$: C, 40.08; H, 6.71; N, 5.04; I, 45.70. Found: C, 41.37; H, 7.07; N, 5.15; I, 45.50.

*Example 6*

(A) 1'-(ω-dimethylaminopropyl)-benzo(1'',2'':7,8)bicyclo(2,2,2)octano(2,3:3',4')pyrrolidin-5-ene-2',5'-dione.

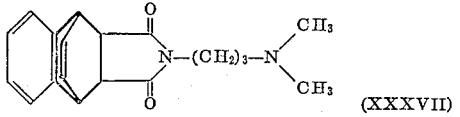

(XXXVII)

To a solution of 0.844 g. of benzo(1'',2'':7,8)bicyclo(2,2,2)oct-5-ene2,3-dicarboxylic anhydride in 20 cc. of dioxane a solution of 0.447 g. of N-dimethylaminopropylamine in 18 cc. of dioxane is added dropwise, and the mixture is refluxed on an oil bath at 120° C. for 6 hours. Removal of the solvent gives 1.320 g. of the oily substance which gradually crystallizes on standing. The crude crystals are recrystallized from diethyl ether to give 0.917 g. of 1'-(ω-dimethylaminopropyl)-benzo(1'',2'':7,8)bicyclo(2,2,2)octano(2,3:3',4')pyrrolidin-5-ene-2',5'-dione as plates melting at 132° to 132.5° C.

*Analysis.*—Calcd. for $C_{19}H_{22}O_2N_2$: C, 73.52; H, 7.14; N, 9.03. Found: C, 73.73; H, 7.36; N, 9.34.

(B) 1'-(ω-dimethylaminopropyl)-benzo(1'',2'':7,8)bicyclo(2,2,2)octano(2,3:3',4')pyrrolidin-5-ene.

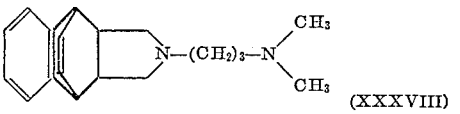

(XXXVIII)

To a solution of 0.6 g. of lithium aluminum hydride in 10 cc. of a 1:1 (by volume) mixture of diethyl ether and tetrahydrofuran a solution of 0.871 g. of 1'-(ω-dimethylaminopropyl) - benzo(1'',2'':7,8)bicyclo(2,2,2)octano(2,3:3',4')pyrrolidin-5-ene-2',5'-dione in 50 cc. of tetrahydrofuran is added with stirring. The mixture is refluxed at 53.5° C. for 5 hours, and excess of lithium aluminum hydride is decomposed by the addition of 3.5 cc. of water under ice-cooling (about 5° C.). After further stirring for 0.5 hour at room temperature (about 20° C.), the ether-tetrahydrofuran layer is separated. The precipitate is twice extracted with the 1:1 mixture of ether and tetrahydrofuran. These ether-tetrahydrofuran layers are combined and dried over sodium sulfate. After removal of the solvent the residue is distilled under a reduced pressure (0.005 mm. Hg) to give 0.377 g. of 1'-(ω-dimethylaminopropyl) - benzo(1'',2'':7,8)bicyclo(2,2,2)octano(2,3:3',4')pyrrolidin-5-ene as a fraction boiling at 141° C./0.005 mm. Hg.

*Analysis.*—Calcd. for $C_{19}H_{26}H_2 \cdot \frac{1}{2}H_2O$: C, 78.30; H, 9.34. Found: C, 78.58; H, 9.63.

(C) Dimethiodide of 1'-(ω-dimethylaminopropyl)-benzo(1'',2'':7,8)bicyclo(2,2,2)octano(2,3:3',4')pyrrolidin - 5-ene.

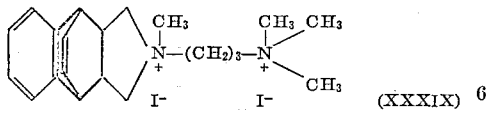

(XXXIX)

To 0.243 g. of 1'-(ω-dimethylaminopropyl)-benzo(1'',2'':7,8) bicyclo(2,2,2) octano(2,3:3'-4') pyrrolidin - 5 - ene are added 1.375 g. of methyl iodide and 10 cc. of methanol, and the mixture is refluxed at about 65° C. for 3 hours. Then, the solvent is removed off from the reaction mixture by distillation to give 0.483 g. of the crude dimethiodide which is recrystallized from methanol-acetone (1:1 by volume) to give hygroscopic needles.

*Analysis.*—Calcd. for $C_{21}H_{32}N_2I_2$: C, 44.53; H, 5.69;
N, 4.94; I, 44.82. Found: C, 44.79; H, 5.87; N, 5.515; I, 45.03.

*Example 7*

(A) 1'-(ω-dimethylaminopropyl)-benzo(1'',2'':7,8)bicyclo(2,2,2)octano(2,3:3',4')pyrrolidin-2',5',5-trione.

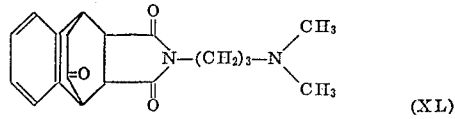

(XL)

To a solution of 15 g. of 5-oxo-benzo(1'',2'':7,8)bicyclo(2,2,2)octane-2,3-dicarboxylic anhydride in 200 cc. of dioxane a solution of 6.5 g. of N-dimethylaminopropylamine in 60 cc. of dioxane is added dropwise, and the mixture is refluxed on an oil bath at 110° C. for 6 hours. Removal of the solvent from the reaction mixture gives 24.8 g. of oily substance which gradually crystallizes on standing at about 20° C. The crude crystals are recrystallized from acetone to give 19.25 g. of 1'-(ω-dimethylaminopropyl) - benzo(1'',2'':7,8)bicyclo(2,2,2)octano(2,3:3',4')pyrrolidine-2',5',5-trione as needles melting at 117° to 118° C.

*Analysis.*—Calcd. for $C_{19}H_{22}O_3N_2$: C, 69.92; H, 6.79; N, 8.58. Found: C, 70.21; H, 6.89; N, 8.68.

(B) 1'-(ω-dimethylaminopropyl)-benzo(1'',2'':7,8)bicyclo(2,2,2)octano(2,3:3',4')pyrrolidin-5-ol, having the structural formula

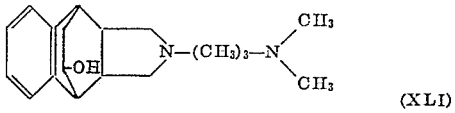

(XLI)

is prepared by reducing compound (XL) with lithium aluminum hydride in a manner similar to that exemplified in Example 6(B).

(C) Dimethiodide of 1'-(ω-dimethylaminopropyl)-benzo(1'',2'':7,8)bicyclo(2,2,2)octano(2,3:3',4')pyrrolidin - 5-ol.

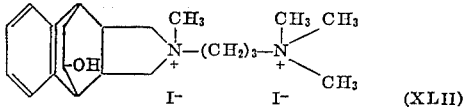

(XLII)

To 0.972 g. of 1'-(ω-dimethylaminopropyl)-benzo(1'',2'':7,8)bicyclo(2,2,2)octano(2,3:3',4')pyrrolidin-5-ol are added 3.648 g. of methyl iodide and 10 cc. of methanol, and the mixture is refluxed at about 65° C. for 3 hours. The solvent is removed from the reaction mixture by distillation to give 2.051 g. of the crude dimethiodide which is recrystallized from methanol-acetone (1:1 by volume) to give 0.945 g. of plates melting at 262° to 264° C.

*Analysis.*—Calcd. for $C_{21}H_{34}ON_2I_2 \cdot \frac{1}{2}H_2O$: C, 42.50; H, 5.94; N, 4.72; I, 42.78. Found: C, 42.83; H, 5.89; N, 4.68; I, 42.32.

*Example 8*

(A) The Imide: To a solution of 4.0 g. of bicyclo(2,2,2)octo-7-ene-2,3-dicarboxylic anhydride in 35 cc. of dioxane are added 3.0 g. of pyrrolidinoethyl amine. The resulting mixture is refluxed for 13 hrs. at from 120° to 130° C. on an oil-bath. After removing the solvent by distillation, the residue is crystallized. Recrystallization from ethanol yields 5.3 g. of 1'-(ω-pyrrolidinoethyl)-bicyclo(2,2,2)octano(2,3:3',4')pyrrolidin-7-ene-2',5'-dione as columns, M.P. 104° to 105° C.

*Analysis.*—Calcd. for $C_{16}H_{22}O_2N_2$: C, 70.04; H, 8.08; N, 10.21. Found: C, 70.36; H, 8.18; N, 10.23.

(B) The Amine: To a suspension of 3.5 g. of lithium aluminum hydride in 80 cc. of ethyl ether, a solution of 4.0 g. of 1'-(ω-pyrrolidinoethyl)bicyclo(2,2,2)octano(2,3:3',4')pyrrolidin-7-ene-2',5'-dione in 300 cc. of ethyl ether is added dropwise with stirring. The dropwise addition takes about 45 min. Then the mixture is refluxed for 3 hrs. on a water-bath. After cooling to about 25° C., the excess reducing agent (lithium aluminum hydride) is decomposed by adding thereto 15 cc. of water with stirring. The ether layer is separated. The residue is extracted with ethyl ether, and all of the ether solution is evaporated. The oily residue is distilled in vacuo (5 mm. Hg) to give 2.96 g. of 1'-(ω-pyrrolidinoethyl)-bicyclo(2,2,2)octano (2,3:3',4')pyrrolidin-7-ene as fraction of B.P. 154° to 157° C./5 mm. Hg, which crystallized on standing M.P. 45° to 47° C.

*Analysis.*—Calcd. for $C_{16}H_{26}N_2$: C, 77.00; H, 10.64; N, 11.37. Found: C, 77.91; H, 10.87; N, 11.13.

(C) The Quaternary Salt: To a solution of 2.3 g. of 1'-(ω-pyrrolidinoethyl) bicyclo(2,2,2)octano (2,3:3',4') pyrrolidin-7-ene in 8 cc. of methanol 12 g. of methyl iodide are added and the resulting mixture is refluxed for 6 hrs. at about 65° C. After removing the solvent by distillation, the residue is crystallized by the addition thereto of a small quantity (5 cc.) of ethanol. Recrystallization from water yields 2.5 g. of the dimethiodide salt (Formula XLVII) as plates, M.P. 238° to 240° C. (decomp.).

*Analysis.*—Calcd. for $C_{18}H_{32}N_2I_2 \cdot \frac{1}{2} H_2O$: C, 40.09; H, 6.17; N, 5.20; I, 47.07. Found: C, 40.05; H, 6.25; N, 5.23; I, 46.37.

Further examples of compounds prepared according to the present invention are as follows:

M.P. 266° to 267° C.

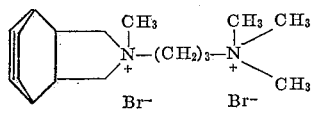

(XLIII)

Dimethobromide of 1'-(ω-dimethylaminopropyl)-bicyclo(2,2,2) octano(2,3:3',4')pyrrolidin-7-ene

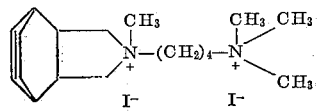

(XLIV)

Dimethiodide of 1'-(ω-dimethylaminobutyl)-bicyclo(2,2,2) octano(2,3:3',4')pyrrolidin-7-ene

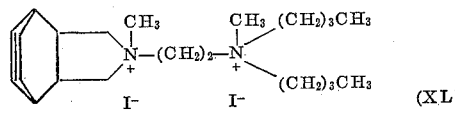

(XLV)

Dimethiodide of 1'-(ω-dibutylaminoethyl)-bicyclo(2,2,2) octano(2,3:3',4')pyrrolidin-7-ene M.P. 182° to 183° C.

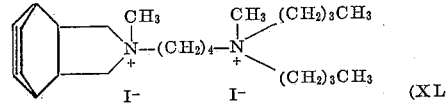

(XLVI)

Dimethiodide of 1'-(ω-dibutylaminobutyl)-bicyclo(2,2,2) octano(2,3:3',4')pyrrolidin-7-ene M.P. 238° to 240° C.

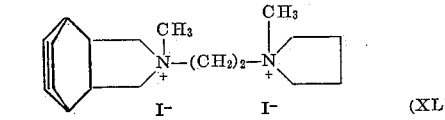

(XLVII)

Dimethiodide of 1'-pyrrolidinoethyl-bicyclo(2,2,2)octano-(2,3:3',4')octano(2,3:3',4')pyrrolidin-7-ene

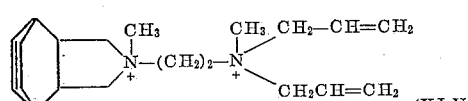

(XLVIII)

Dimethiodide of 1'-(ω-diallylaminoethyl)-bicyclo(2,2,2) octano(2,3:3',4')pyrrolidin-7-ene M.P. 173° to 175° C.

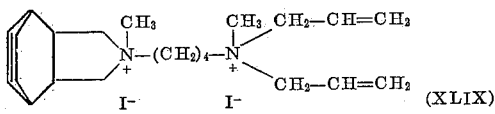

(XLIX)

Dimethiodide of 1'-(ω-diallylaminobutyl)-bicyclo(2,2,2) octano(2,3:3',4')pyrrolidin-7-ene The present invention is directed to free bases, therapeutically acceptable, i.e. essentially non-toxic, mono- and di-acid addition salts of the free bases and therapeutically acceptable, i.e. essentially non-toxic, mono- and di-acid addition salts of the free bases and therapeutically acceptable, i.e. essentially non-toxic, mono- and di-quaternary ammonium salts of the free bases. Said free bases are represented by the following formulae:

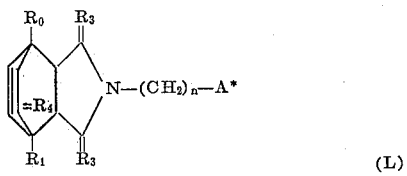

(L)

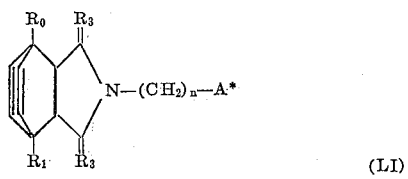

(LI)

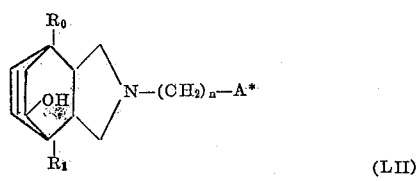

(LII)

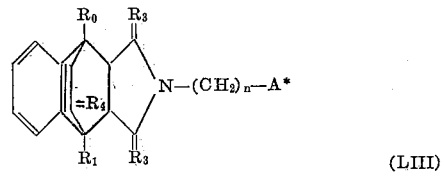

(LIII)

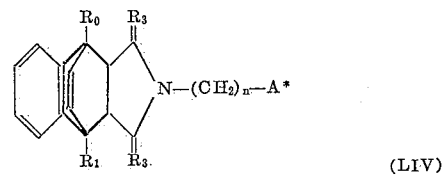

(LIV)

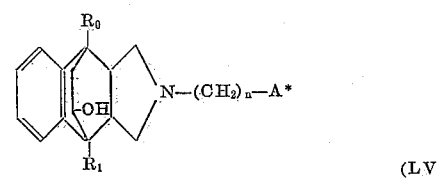

(LV)

wherein $R_0$ is either a hydrogen atom or a lower alkyl group, e.g. methyl, ethyl, propyl, isopropyl; $R_1$ is either a hydrogen atom or a lower alkyl group, e.g. methyl, ethyl, normal propyl, isopropyl; $R_3$ is either =O or $$\diagup H$$
$$\diagdown H$$

$R_4$ is either =O or $$\diagup H$$
$$\diagdown H$$

A* is N-dialkyl wherein each alkyl group is independently either normal or branched chain and contains from 1 to 5 carbon atoms, N-dialkenyl wherein each alkenyl group contains from 2 to 5 carbon atoms and may also be branched chain, or an -N-(saturated)heterocyclic ring, preferably a 5- or 6-membered carbon-containing ring such as morpholino, piperidino, pyrrolidino, piperazino and N-methylpiperazino; and $n$ is an integer from 2 to 5, whereby —$(CH_2)_n$— is a lower alkylene group separating two nitrogen atoms by at least a 2-carbon atom chain.

Common to all of the structural Formulae L to LV is the grouping

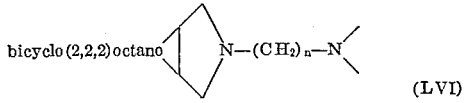

(LVI)

which may contain oxo groups in the 2'- and the 5'-positions. The mono-salts are defined by the structure

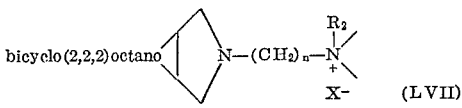

(LVII)

which, correspondingly, may contain oxo groups in the 2'- and the 5'-positions and wherein $R_2$ is either a hydrogen atom or a lower alkyl group, e.g. methyl, ethyl and propyl; and X is either an inorganic anion, e.g. a halide (chloride, bromide, iodide) and a sulfate, or an organic anion, e.g. oxalate, acetate, malate, maleate, succinate, citrate, tartarate, naphthalenedisulfonate, phenolphthalinate and methylenedisalicylate. When $R_2$ is hydrogen, the mono-salt is an acid addition salt; when $R_2$ is a lower alkyl group, the mono-salt is a quaternary ammonium salt.

The di-salts are defined by the structure

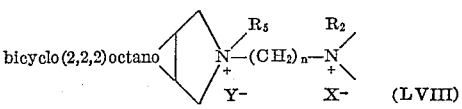

(LVIII)

which, correspondingly, may contain oxo groups in the 2'- and the 5'-positions. $R_2$ and X have the same meanings as indicated supra for the mono-salts; $R_5$ is either a hydrogen atom or a lower alkyl group, e.g. methyl, ethyl and propyl; and Y is either an inorganic anion, e.g. a halide (chloride, bromide, iodide) and a sulfate, or an organic anion, e.g. oxalate, acetate, malate, maleate, succinate, citrate, tartarate, naphthalenedisulfonate, phenolphthalinate and methylenedisalicylate. When $R_2$ and $R_5$ are both hydrogen, the compound is a di-acid addition salt; when $R_2$ and $R_5$ are both lower alkyl groups (either the same or different), the compound is a di-quaternary ammonium salt.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

This application is a continuation-in-part of application Serial No. 817,067, filed on June 1, 1959, now abandoned.

Having thus described our invention, we claim:

1. A compound selected from the group consisting of a free base, a therapeutically acceptable quaternary ammonium salt of the free base and a therapeutically acceptable acid addition salt of the free base, said free base having the formula

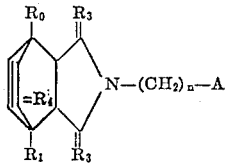

wherein $R_0$ is a member selected from the group consisting of a hydrogen atom and a lower alkyl group having 1 to 3 carbon atoms; $R_1$ is a member selected from the group consisting of a hydrogen atom and a lower alkyl group having from 1 to 3 carbon atoms; $R_3$ is a member selected from the group consisting of $=O$ and

$R_4$ is a member selected from the group consisting of $=O$ and

A is a member selected from the group consisting of -N-di(lower) alkyl, $=N=$di(lower)alkenyl, morpholino, piperidino, pyrrolidino, piperazino, N-methylpiperazino and pyrazolidino, each of said alkyl and alkenyl groups having at most 5 carbon atoms; and $n$ is an integer from 2 to 5.

2. 1' - [ω - di(lower)alkylamino(lower)alkyl]bicyclo (2,2,2)octano(2,3:3',4')pyrrolidin-7-ene.

3. 1' - [ω - di(lower)alkylamino(lower)alkyl]bicyclo (2,2,2)octano(2,3:3',4')pyrrolidin-7-ene-2',5'-dione.

4. 1' - [ω - di(lower)alkenylamino(lower)alkyl]bicyclo (2,2,2)octano(2,3:3',4')pyrrolidin-7-ene.

5. 1' - [ω - di(lower)alkenylamino(lower)alkyl]bicyclo (2,2,2)octano(2,3:3',4')pyrrolidin-7-ene-2',5'-dione.

6. 1' - [ω - di(lower)alkylamino(lower)alkyl]-1,4-di(lower)alkyl-bicyclo (2,2,2)octano(2,3:3',4')pyrrolidin-7-ene.

7. 1' - [ω - di(lower)alkylamino(lower)alkyl] - 1,4-di(lower)alkyl-bicyclo(2,2,2)octano(2,3:3',4')pyrrolidin-7-ene-2',5'-dione.

8. 1' - (ω - dimethylaminopropyl) - bicyclo(2,2,2)octano(2,3:3',4')pyrrolidin-7-ene dimethiodide.

9. 1' - (ω - pyrrolidinoethyl)-bicyclo(2,2,2)octano(2,3:3',4')pyrrolidin-7-ene dimethodide.

10. 1'-(ω-dimethylaminoethyl)-bicyclo(2,2,2)octano(2,3:3',4')pyrrolidin-7-ene.

11. 1' - (ω - dimethylaminoethyl)-bicyclo(2,2,2)octano-(2,3:3',4')pyrrolidin-7-ene dimethiodide.

12. 1'-(ω-dimethylaminoethyl)-bicyclo(2,2,2)octano(2,3:3',4')pyrrolidin-7-ene.

13. 1' - (ω-diethylaminoethyl)bicyclo(2,2,2)octano(2,3:3',4')pyrrolidin-7-ene dimethiodide.

14. 1' - (ω-diethylaminoethyl)-bicyclo(2,2,2)octano(2,3:3',4')pyrrolidin-7-ene dimethochloride.

15. 1' - (ω-dimethylaminopropyl) - bicyclo(2,2,2)octano(2,3:3',4')pyrrolidin-7-ene.

16. 1' - ω - dimethylaminopropyl) - bicyclo(2,2,2)octano(2,3:3',4')pyrrolidin-7-ene dimethochloride.

17. 1' - (ω-diethylaminobutyl)bicyclo(2,2,2)octano(2,3:3',4')pyrrolidin-7-ene dimethiodide.

18. 1' - (ω-dimethylaminopropyl) - 1,4-dimethyl-bicyclo(2,2,2)octano(2,3:3',4')pyrrolidin-7-ene.

19. 1' - (ω-dimethylaminopropyl)-1,4 - dimethyl-bicyclo(2,2,2)octano(2,3:3',4')pyrrolidin-7-ene-dimethiodide.

20. A compound selected from the group consisting of a free base, a therapeutically acceptable quaternary ammonium salt of the free base and a therapeutically acceptable acid addition salt of the free base, said free base having the formula

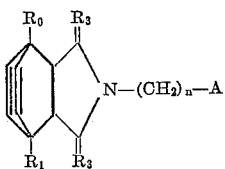

wherein $R_0$ is a member selected from the group consisting of a hydrogen atom and a lower alkyl group having from 1 to 3 carbon atoms; $R_1$ is a member selected from the group consisting of a hydrogen atom and a lower alkyl group having from 1 to 3 carbon atoms; $R_3$ is a member selected from the group consisting of =O and

A is a member selected from the group consisting of -N-di(lower)alkyl, -N-di(lower)alkenyl, morpholino, piperidino, pyrrolidino, piperazino, N-methylpiperazino and pyrazolidino, each of said alkyl and alkenyl groups having at most 5 carbon atoms; and $n$ is an integer from 2 to 5.

21. A compound selected from the group consisting of a free base, a therapeutically acceptable quaternary ammonium salt of the free base and a therapeutically acceptable acid addition salt of the free base, said free base having the formula

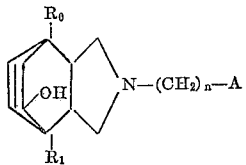

wherein $R_0$ is a member selected from the group consisting of a hydrogen atom and a lower alkyl group having from 1 to 3 carbon atoms; $R_1$ is a member selected from the group consisting of a hydrogen atom and a lower alkyl group having from 1 to 3 carbon atoms; A is a member selected from the group consisting of -N-di(lower)alkyl, -N-di(lower) alkenyl, morpholino, piperidino, pyrrolidino, piperazino, N-methyl-piperazino and pyrazolidino, each of said alkyl and alkenyl groups having at most 5 carbon atoms; and $n$ is an integer from 2 to 5.

22. A compound selected from the group consisting of a free base, a therapeutically acceptable quaternary ammonium salt of the free base and a therapeutically acceptable acid addition salt of the free base, said free base having the formula

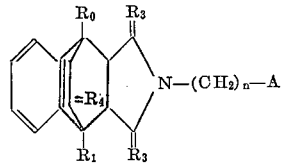

wherein $R_0$ is a member selected from the group consisting of a hydrogen atom and a lower alkyl group having from 1 to 3 carbon atoms; $R_1$ is a member selected from the group consisting of a hydrogen atom and a lower alkyl group having from 1 to 3 carbon atoms; $R_3$ is a member selected from the group consisting of =O and

$R_4$ is a member selected from the group consisting of =O and

A is a member selected from the group consisting of -N-di(lower)alkyl, -N-di(lower)alkenyl, morpholino, piperidino, pyrrolidino, piperazino, N-methylpiperazino and pyrazolidino, each of said alkyl and alkenyl groups having at most 5 carbon atoms; and $n$ is an integer from 2 to 5.

23. A compound selected from the group consisting of a free base, a therapeutically acceptable quaternary ammonium salt of the free base and a therapeutically acceptable acid addition salt of the free base, said free base having the formula

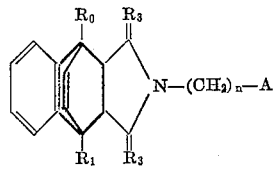

wherein $R_0$ is a member selected from the group consisting of a hydrogen atom and a lower alkyl group having from 1 to 3 carbon atoms; $R_1$ is a member selected from the group consisting of a hydrogen atom and a lower alkyl group having from 1 to 3 carbon atoms; $R_3$ is a member selected from the group consisting of =O and

A is a member selected from the group consisting of -N-di(lower)alkyl, -N-di(lower)alkenyl, morpholino, piperidino, pyrrolidino, piperazino, N-methylpiperazino and pyrazolidino, each of said alkyl and alkenyl groups having at most 5 carbon atoms; and $n$ is an integer from 2 to 5.

24. 1' - [ω - di(lower)alkylamino(lower)alkyl]-benzo-(1'',2'':7,8)bicyclo(2,2,2)octano(2,3:3',4')pyrrolidin - 5-ene.

25. 1' - (ω - dimethylaminopropyl)-benzo(1'',2'':7,8)-bicyclo(2,2,2)octano(2,3:3',4')pyrrolidin-5-ene dimethiodide.

26. 1' - [ω - dimethylaminopropyl) -benzo(1'',2'':7,8)-bicyclo(2,2,2)octano(2,3:3',4')pyrrolidin-5-ene.

27. A compound selected from the group consisting of a free base, a therapeutically acceptable quaternary ammonium salt of the free base and a therapeutically acceptable acid addition salt of the free base, said free base having the formula

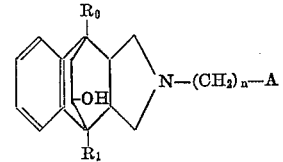

wherein $R_0$ is a member selected from the group consisting of a hydrogen atom and a lower alkyl group having from 1 to 3 carobn atoms; $R_1$ is a member selected from the group consisting of a hydrogen atom and a lower alkyl group having from 1 to 3 carbon atoms; A is a member selected from the group consisting of -N-di(lower)alkyl, -N-di(lower)alkenyl, morpholino, piperidino, pyrrolidino, piperazino, N-methylpiperazino and pyrazolidino, each of said alkyl and alkenyl groups having at most 5 carbon atoms; and $n$ is an integer from 2 to 5.

28. 1' - [ω-di(lower)alkylamino(lower)alkyl] - benzo-(1'',2'':7,8)bicyclo(2,2,2)octano(2,3:3',4')pyrrolidine - 5-ol.

29. 1' - (ω-dimethylaminopropyl) - benzo(1'',2'':7,8)-bicyclo(2,2,2)octano(2,3:3',4')pyrrolidin-5-ol.

30. Dimethiodide of 1'(ω-dimethylaminopropyl)-benzo(1'',2'':7,8)bicyclo(2,2,2)octano(2,3:3',4')pyrrolidin-5-ol.

31. 1' - [ω - pyrrolidino(lower)alkyl]bicyclo(2,2,2)-octano(2,3:3',4')pyrrolidin-7-ene.

32. 1' - [ω - pyrrolidino(lower)alkyl]bicyclo(2,2,2)-octano(2,3:3',4')pyrrolidin-7-ene-2',5'-dione.

References Cited in the file of this patent

FOREIGN PATENTS 760,039    Great Britain _____ Oct. 31, 1956

OTHER REFERENCES

Rice et al.: J. American Chem. Soc., vol. 75, pages 4911–4915 (1953).

Takeda et al.: Japanese Heart Journal, vol. 1, No. 2, pages 189–197 (1960).